Oct. 23, 1934.  F. W. BREHMER  1,978,248
PROCESS OF CUTTING THREADS AND MACHINE THEREFOR
Filed Sept. 13, 1929  8 Sheets-Sheet 2
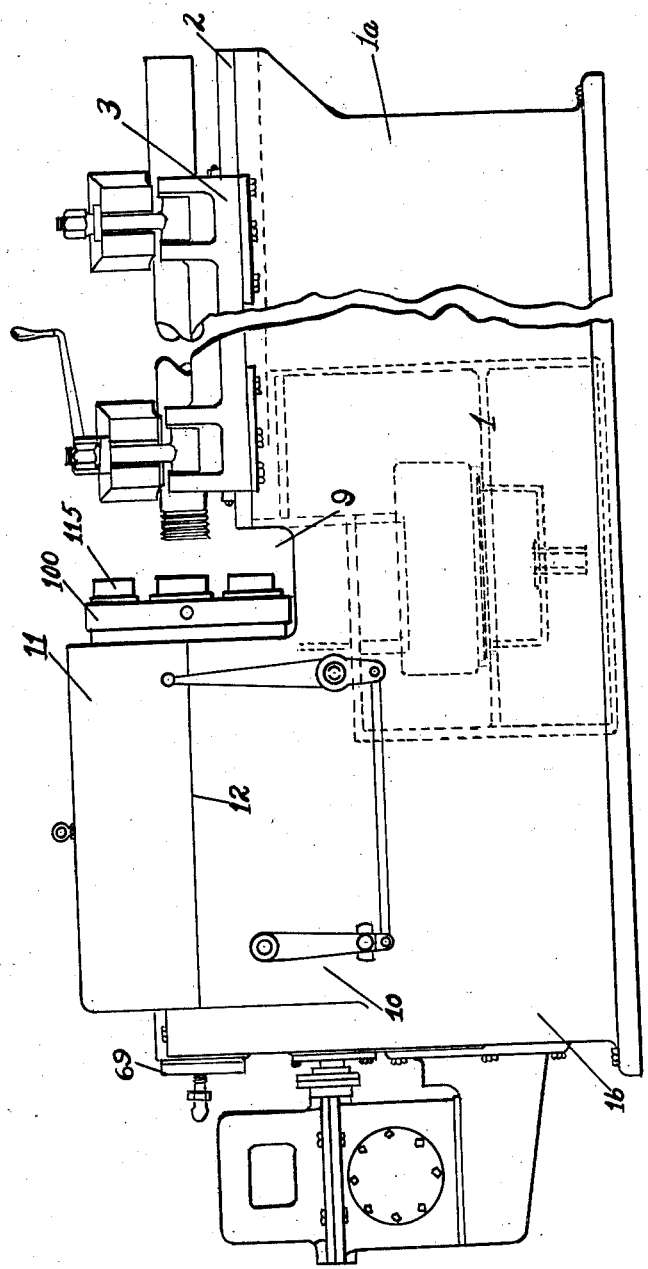
INVENTOR.
Frederick W Brehmer
BY
ATTORNEYS

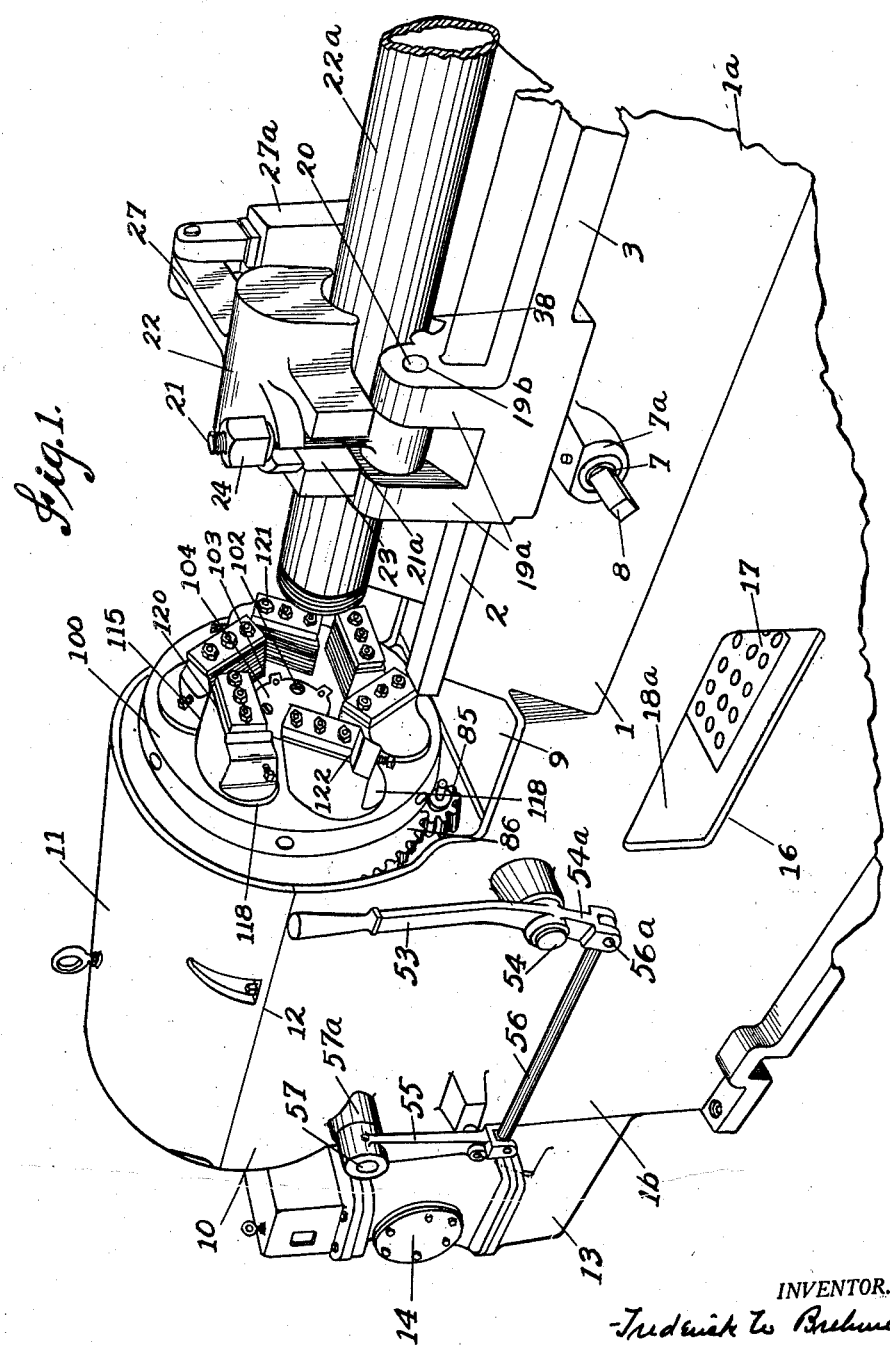

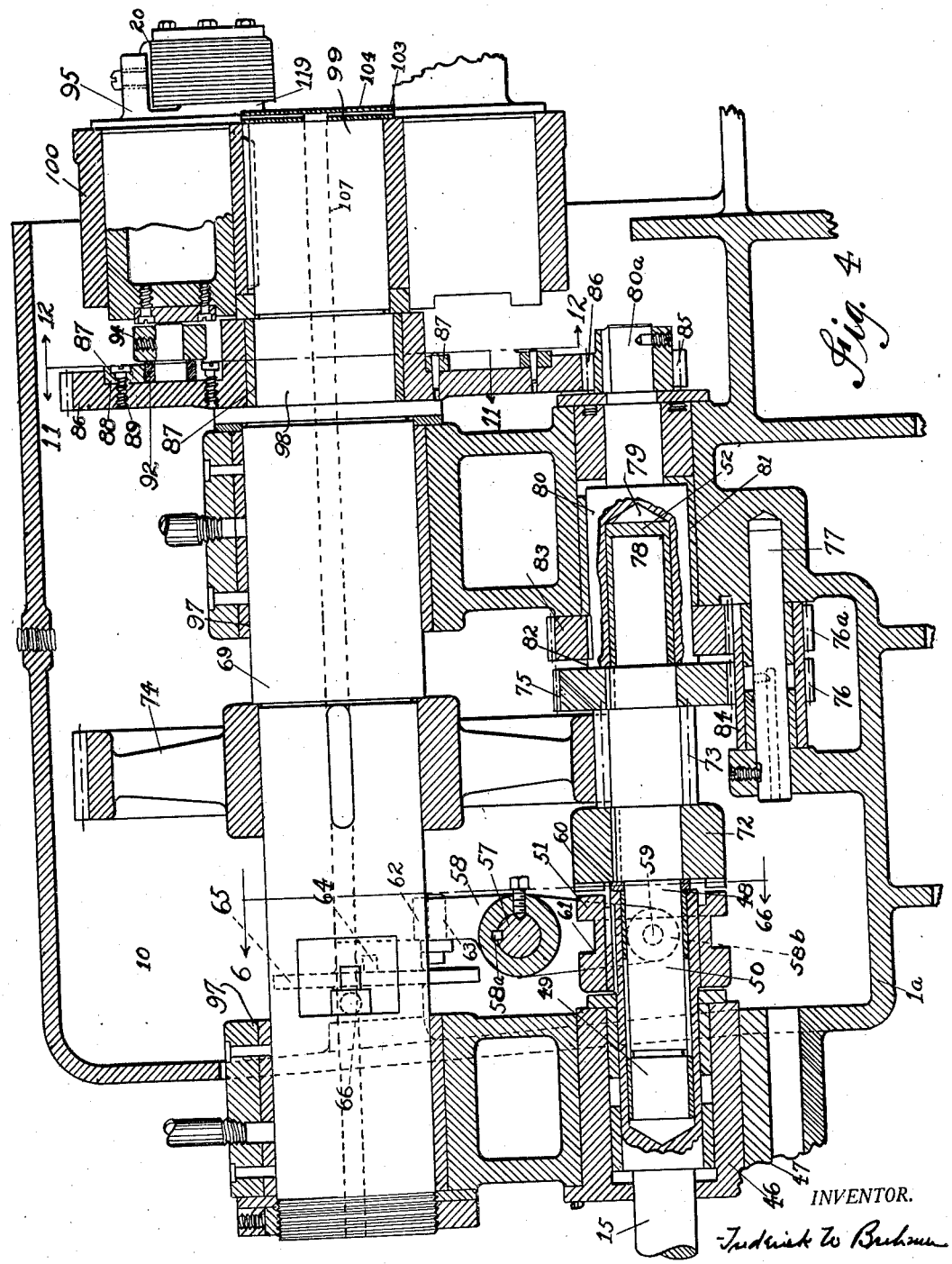

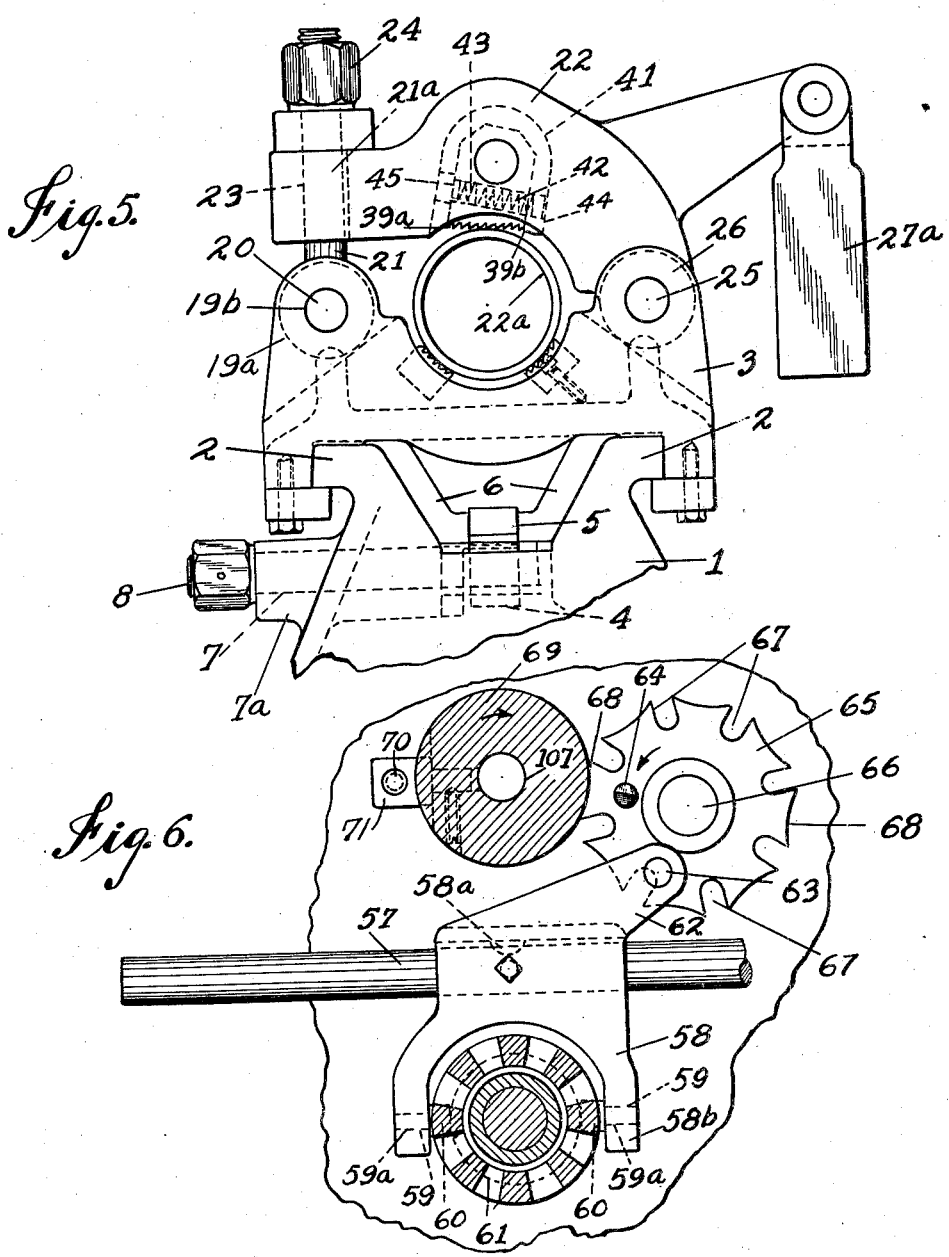

Oct. 23, 1934.   F. W. BREHMER   1,978,248
PROCESS OF CUTTING THREADS AND MACHINE THEREFOR
Filed Sept. 13, 1929   8 Sheets-Sheet 5
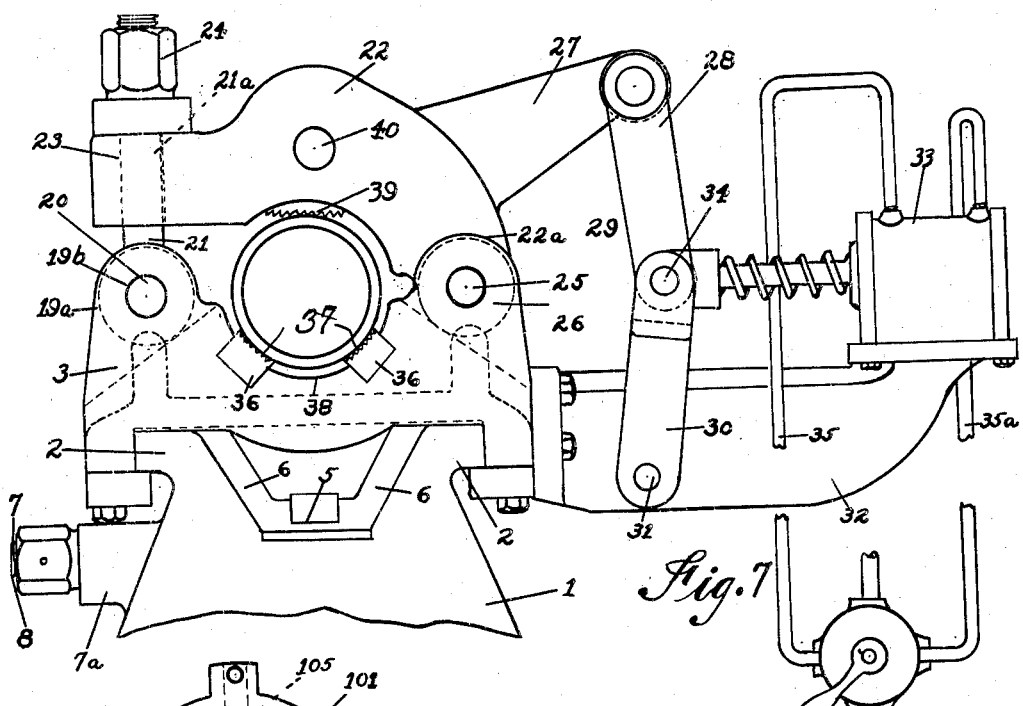
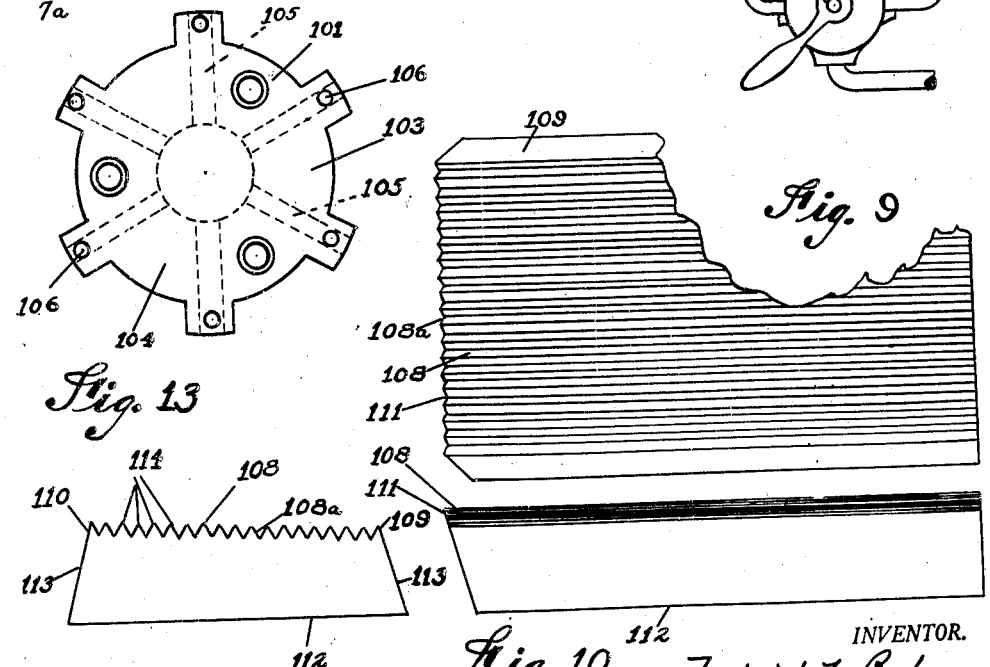
INVENTOR.
Frederick W. Brehmer
BY
ATTORNEYS.

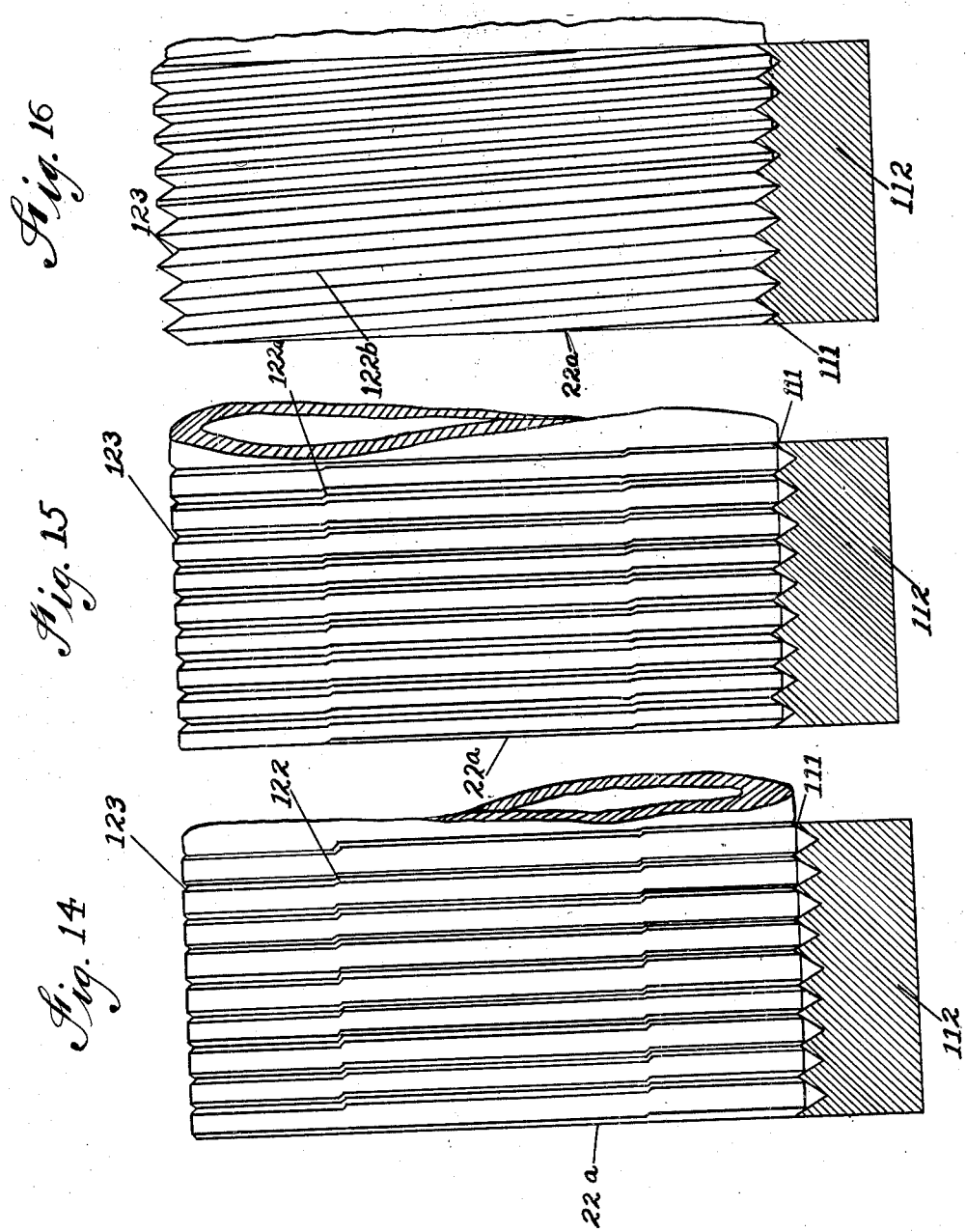

Oct. 23, 1934.   F. W. BREHMER   1,978,248
PROCESS OF CUTTING THREADS AND MACHINE THEREFOR
Filed Sept. 13, 1929   8 Sheets-Sheet 8
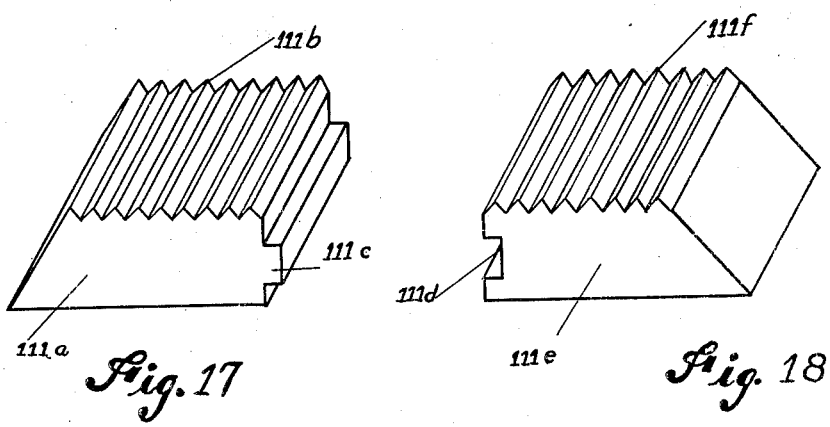
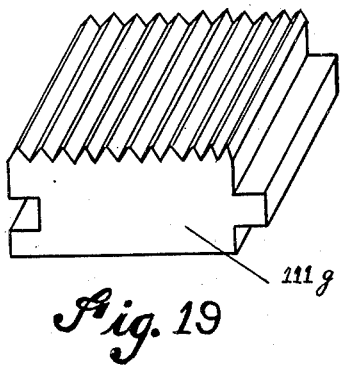
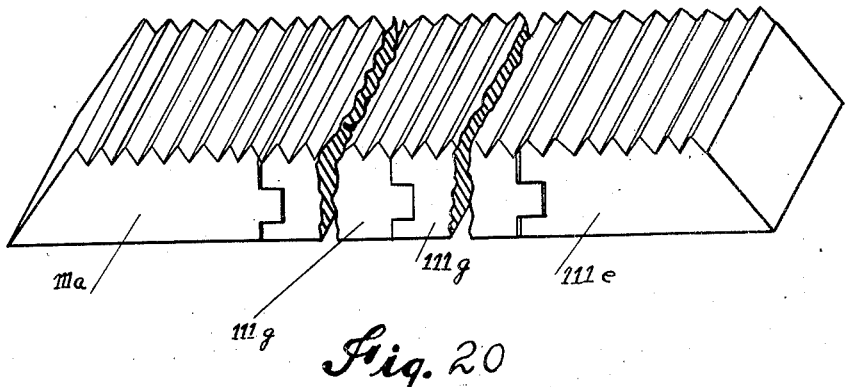
INVENTOR.
BY
ATTORNEY.

Patented Oct. 23, 1934

1,978,248

UNITED STATES PATENT OFFICE 1,978,248

PROCESS OF CUTTING THREADS AND MACHINE THEREFOR

Frederick W. Brehmer, Cincinnati, Ohio, assignor of seven twenty-fourths to Frank M. Andrews, Fort Thomas, Ky., seven twenty-fourths to Stanley G. Clark, Cincinnati, Ohio, and four twenty-fourths to William G. Funk, Covington, Ky.

Application September 13, 1929, Serial No. 392,436

22 Claims. (Cl. 10—96)

My invention relates to a novel process for developing helixes or threads on pipes and other cylindrical surfaces, and to a machine operable on the principle of my process. My invention relates particularly to the art of cutting tapered threads on pipes such as are well known in the art for joining pipes and fittings in a continuous circuit.

It is the object of my invention to develop tapered pipe threads by means of chasing members rotatively attached to a rotating head, which during their movement advance the object being threaded intermittently to allow for the desired spiral formation of the thread.

It is another object of my invention to provide chasing members that can easily be replaced and made interchangeable from one cutting position to another.

A further object is to provide a rotating member that will automatically move the chasing members to a desired depth in the material being threaded. In the furtherance of this object it is also my purpose to provide means for automatically returning the chasing and thread cutting members to a fully open position suitable for receiving another object to be threaded.

A still further object is to provide an automatic clutch release mechanism that will be timed so as to stop the machine after the desired number of threads have been cut, and which will keep all rotating parts in proper relation at all times.

Another object of my invention is to provide a system of gearing so constructed and arranged as to permit a rotating member to advance a definite amount in relation to another adjoining rotating member while being driven from the same source; which will permit the step by step advance and contraction of the die carriers.

Another object is to provide thread chasing tools or dies which will be self cleaning and constructed of plane surfaces which will be simple in construction and inexpensive to make.

A further object is to provide a self-adjusting clamping means for an article being threaded, so that the article will be held from rotative and lateral movement during the threading operation.

Broadly, it is the object of my invention to provide a process of pipe threading in which radially spaced dies having plane surfaces are relatively offset longitudinally of the article to produce a desired lead in the article being threaded dependent on the number of dies and the pitch of the thread desired. Specifically for example, if I desire a thread with a quarter inch lead and if I have six radially spaced dies, each die will be offset one sixth of one quarter inch, and as the head carrying the dies is rotated around the object, the teeth of the dies instead of following around along the true arcs of the circumference will jump across with the grooves cut by their adjacent dies. Every one sixth revolution all the dies advance the object being cut one twenty-fourth of an inch. As the grooves are cut deeper and deeper, the offset grooves become less and less apparent until when the full depth of the thread is reached the thread approaches a true helix.

The above and other objects which will be more specifically pointed out in the specification and drawings, I accomplish by that certain combination and arrangement of parts of which I have shown a preferred embodiment.

In the drawings:

Figure 1 is a perspective view of part of the machine looking into the die.

Figure 2 is a side elevation of the machine with parts of the bed broken away to indicate that the length may be in accordance with shop requirements.

Figure 3 is a side elevation with parts in section showing the cam and connections for the die holders or carriers.

Figure 4 is a vertical section through the head of the machine.

Figure 5 is an end elevation showing the clamp for holding the object to be threaded.

Figure 6 is a section on the line 6—6 of Figure 4 showing the clutch release and timing mechanism.

Figure 7 is an end elevation showing an alternative for operating the clamp hydraulically.

Figure 8 is an end elevation of a die or chasing tool.

Figure 9 is a top plan view of a die or chasing tool.

Figure 10 is a side elevation of a die or chasing tool.

Figure 13 is a detail of the face plate with oil channels in detail.

Figure 14 is a side elevation of a pipe after one revolution of the head.

Figure 15 is a side elevation of a pipe after three revolutions of the head.

Figure 16 is a side elevation of a pipe after completion of the thread cutting operation.

Figure 17 is a perspective view of the left hand portion of a composite die.

Figure 18 is a perspective view of the right hand portion of a composite die.

Figure 19 is a perspective view of a filler piece for a composite die.

Figure 20 is a perspective view of the composite assembly of die pieces such as are indicated in Figures 17 to 19.

*Main frame*

Figure 11:
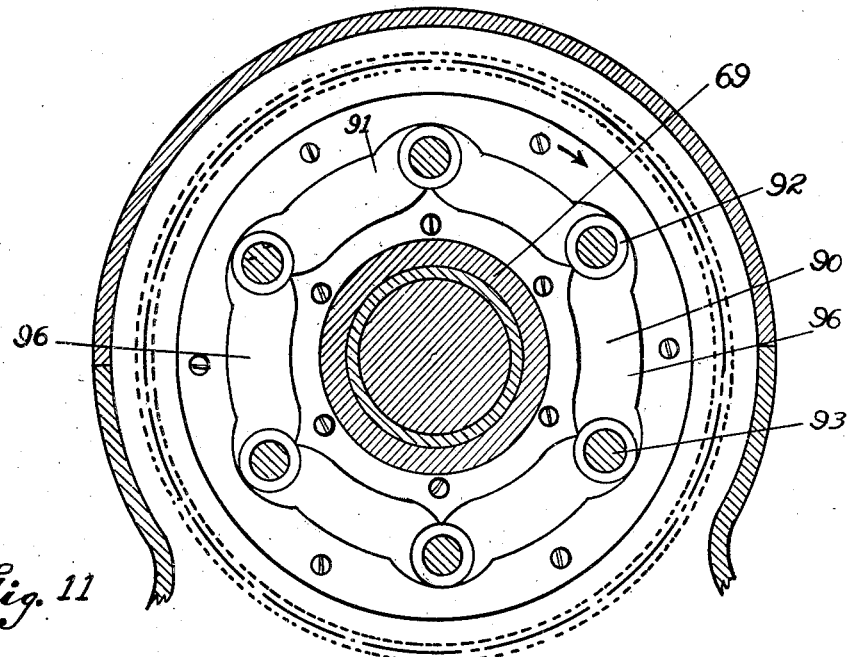
Figure 11 is a section on the line 11 of Figure 4 showing the cam with rollers in stop position.
Figure 12:
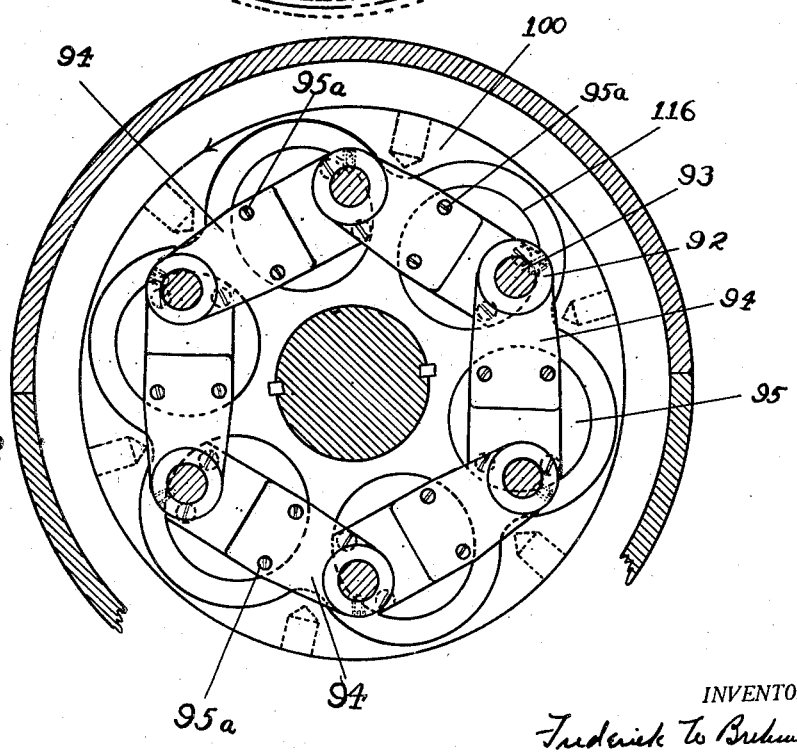
Figure 12 is a section on the line 12—12 of Figure 4 showing the crank-arms for rotating the die holder.

I have shown a main bed similar in construction to beds used on latches which is the supporting structure of my machine. As illustrated in Figure 1 on the right end 1a of the bed are ways 2 on which a clamp carriage 3 is slidably mounted. The carriage may be moved to left or right, or vice versa for placing the work by means of a gear 4, as indicated in Figure 5, which meshes with a rack 5 rigidly fastened to arms 6 preferably cast integrally with the clamp carriage. The gear 4 is rigidly fastened to a shaft 7 which is rotatively mounted in a bearing 7a in the bed of the machine. The end 8 of the shaft is squared to receive a crank handle. This crank handle when rotated will rotate the shaft and the gear and move the work into position to be threaded. Since the gear is in mesh with the rack on the clamp carriage, it will move the clamp carriage whenever the gear is rotated.

Approximately in the center of the main frame is a gap 9 provided to permit a head to swing clear of the bed without interference, and also to act as a catch basin for oil and chips. The left end 1b of the bed as illustrated in Figure 1, is constructed to provide a gear box 10, which has a removable cover 11 at the top 12, and all parts therein run in oil. On the left side is mounted a bracket 13 for supporting a reduction gear unit 14, which is directly connected to a drive shaft 15 by means of a coupling which compensates for any slight misalignment between the reduction unit and the drive shaft. A motor, not shown, as it forms no part of my invention, is directly connected to the reduction unit in the usual manner and provides the power for driving the machine.

In the lower part 16 of the bed I have provided an oil reservoir from which oil used during the threading operation is taken and returned through a strainer 17, which prevents chips from getting into the cutting oil reservoir. The section of the bed beneath the clamp carriage is constructed so that all oil will drain back to the catch basin. A removable cover closes the catch basin opening 18a and prevents splashing of oil on the floor while the machine is in operation.

*The clamp carriage and pipe clamp*

The clamp carriage 3, as noted, is free to slide on the ways 2 of the main bed, there being no locking device on the manual control for moving the carriage to the right or left. At each end of this carriage there are bosses for pins. The front bosses 19a have holes 19b in which are mounted pins 20. On these pins I have rotatively mounted the bolts 21 which hold the upper jaw 22 of the clamp down on the article to be threaded, (in the illustration a pipe 22a) during the threading operation. The upper jaws have slots 23 so that the bolt ends 21a can slide into them. These slots enable me to swing the bolts out of clamping position without removing the nuts or hand wheels 24 from the bolts.

The upper jaws 22 are rotatively mounted on pins 25 fixed in the rear bosses 26 on the clamp carriage, and after loosening the bolts they may be tipped upwardly so as to permit the removal of the pipe after it has been threaded. Extending from the jaws towards the back of the machine are arms upon which weights 27a are suspended to counterbalance the weight of the jaws and thereby facilitate their adjustment. The above arrangement of parts is for manual operation.

Referring to Figure 7, it will be seen that I have shown an alternative for the hand operation of the upper jaws. All the parts are similarly numbered excepting that in place of the counter-weight I attach a link 28 of a toggle joint 29. Another link 30 of the toggle joint is pivotally mounted on a stud 31 which is rigidly mounted in a bracket 32 fixed to the clamp carriage and movable with it. These brackets are the supports for fluid pressure cylinders 33 which are fastened thereon. The toggle links are pivotally connected to the piston rods which move them by means of pins 34.

Fluid under pressure is admitted into the cylinder through pipes 35 and 35a and controlled by means of a multiple way valve, well known in the art of controlling fluid pressure operated tools. When compressed fluid flows through the pipe 35, the piston, with its rod, will move to the right and pull on the toggle links, causing them to collapse. While they are collapsing the upper jaws will be rotated about their pivots and thereby release their grip on the article being threaded. The pipe 35a during this time will have been open to the atmosphere and relieved the piston of all back pressure. To bring the jaws back down to grip the pipe, the valve is turned so that the fluid will now pass into the pipe 35a and move the piston to the left which in turn will straighten out the toggle joint and press the jaws down on the pipe.

Gripping members 36, with saw tooth profiles 37, are rigidly mounted in concave portions 38 of the clamp carriage. These gripping members are placed approximately one hundred and twenty degrees apart so as to form a V block and grip the pipe securely in conjunction with other similar gripping members 39 pivotally mounted on pins 40 which are fixedly mounted in the upper jaws. A hollow portion 41 in the upper jaw arms provides ample clearance and permits the gripping members to rotate freely within the arms. A spring 42 is mounted in the bottom of a counterbored hole 43 in the gripping members 39, and it bears against the wall 44 of the hollow portion. This spring will return the gripping member as far as a stop 45 which fixes the position and the amount of movement of the gripping members when they are released from contact with an article such as a pipe resting in the clamping carriage. The action of the three gripping members is like the well known Stillson wrench used for turning pipe when connections are made. Since the upper gripping member is pivotally mounted, it will rotate about its pivot with any slight rotation of the pipe. This movement will be very slight because with each change in position of the gripping member its saw tooth profile will penetrate deeper into the surface of the pipe and also jam the pipe tighter against the lower gripping members because the distances of the saw teeth on the left hand end 39a and the center of the pivot of the gripping member are greater than the distances of the saw teeth on the right hand end 39b.

Drive and automatic clutch release

As has been mentioned, the shaft 15 is directly connected to the reduction gear unit and driven by it at the proper speed. This shaft extends into the gear box and is rotatively mounted in a bushing 46 which is fixed in a hole 47 in the main bed. The shaft terminates at 48 and has a hollow portion 49 to receive the end of a shaft 50. The end 48 is splined and has the driving half 51 of a toothed clutch slidably mounted on it which rotates continuously with the shaft. The driven half of the clutch is keyed to the shaft 50. The shaft 50 is rotatively mounted in the hollow portion 49 of the shaft 15 and its other end also rotatively mounted in another hollow shaft 52. This method of mounting permits the shaft 15 to rotate while the shaft 50 is at rest. As mentioned, the driving half of the clutch is slidably keyed to the shaft 15 so that it can slide into engagement with the driven half of the clutch.

These two halves of the clutch are engaged by rotating a clutch handle 53 to the left, as illustrated in Figure 1. This handle is rotatively mounted on a stud 54 which is fixedly mounted in the main bed of the machine. The lower portion 54a of this clutch handle is loosely connected to a lever 55 by means of a link 56.

The lever 55 is fixedly mounted on a shaft 57 which extends through the gear box and is free to rotate in bearings 57a provided in the main bed of the machine. On this shaft 57 is fixed a clutch lever 58 by means of a key 58a. The lower bifurcated end 58b of the clutch lever has holes 59 in which are fixed studs 59a for mounting clutch rollers 60. These clutch rollers ride in an annular groove 61 on the driving half of the clutch and permit the clutch lever to remain stationary while the clutch rotates and also eliminates excessive wear on the groove.

The upper end 62 of the clutch lever has a hole in which is fixedly mounted a pin 63 that is engaged by another pin 64 mounted on a Geneva star wheel 65. When these two pins come into engagement one will slide over on the other and cause the clutch lever to rotate with its shaft, thereby releasing the clutch. After engagement the two pins will separate enough to allow the clutch to be thrown into engagement for the next threading operation.

The Geneva star wheel is rotatively mounted on a stud 66 which is fixedly mounted in the main bed of the machine adjacent to the spindle. In this particular case I have shown a star wheel with eight stops, but do not wish to limit myself to any particular number. This star wheel has eight slots 67 and eight concave lock portions 68 which remain in contact with a shaft 69 while the star wheel is at rest, and thereby keep the star wheel in proper relation for engagement with a star wheel driving pin 70 which is rigidly mounted in a post 71 which in turn is rigidly mounted in the spindle 69. At each engagement of the driving pin with a slot on the Geneva star wheel which happens at each revolution of the spindle, the star wheel will be advanced one-eighth of a turn. In this particular case it will take eight revolutions of the shaft 69 to bring the pins into engagement and release the clutch automatically, as has been explained. The clutch may be disengaged manually in order to stop the machine, but, as will be seen later, the machine will have to make a given number of turns before another threading operation can be started. Obviously this will produce uniform results in production, because for each threading operation there is a definite starting and stopping position.

On the shaft 50 is fixedly mounted a driven half 72 of the clutch which rotates the shaft when the two halves of the clutch are engaged. Adjacent to the driven half of the clutch on the shaft is fixedly mounted a pinion 73 which drives a bull gear 74 keyed fast to the head spindle 69. The head spindle is driven by the bull gear. Alongside of the drive pinion is a spur gear 75 keyed fast to the shaft 50 which drives a pair of idler pinions 76 and 76a rotatively mounted on the shaft 77 fixedly mounted in the main bed of the machine for purposes to be explained. The end 78 of the shaft 50 is free to rotate in the hollow portion 79 of the sleeve bearing 80 and has its bearing therein. This construction allows the shaft 50 and the sleeve bearing 80 to turn independently of each other.

The sleeve bearing 80 is rotatively mounted in the hole 81 in the main frame which extends outside of the box and the end 80a of the bearing has a pinion 85 keyed fast to it for driving a cam which will be hereinafter described. This sleeve terminates as indicated at 82, and butts against the spur gear 75. A second spur gear 83 is rigidly fastened to and drives the sleeve bearing 80. This second spur gear in turn is driven by the idler pinion 76a which is driven by the first spur gear 75. I provide one or more less teeth on the gear 83 than on the first mentioned spur gear 75, and the gear 83 will therefore rotate slightly faster than the gear 75. In this particular case the spur gear 83 has one tooth less than the spur gear 75. Since there are less teeth in the spur gear 83 it will rotate all parts driven by it relatively slightly faster than those parts driven by the spur gear 75 and will cause the cam to rotate and maintain an advanced relation with the head. The two idler pinions are rigidly fastened to the same rotating sleeve 84 on the shaft 77 and therefore rotate at the same rate of speed.

The pinion 85 meshes with and rotates a disc gear 86 which is free to rotate at a greater speed than the spindle on which it is rotatively mounted, as shown at 87 in Figure 4. A cam 87 is rigidly fastened in a counter-bore 88 in the disc gear by means of screws 89. I have illustrated a cam that has six dwells 90 which keep the dies, to be explained, in engagement with a pipe while being threaded, and also six rises 91 which determine the amount of movement of the dies and hence the depth of thread being cut. Rollers 92 are rotatively mounted on studs 93 fixed in crank arms 94. The crank arms 94 are rigidly fastened to the die holders 95 by screws 95a and the rollers 92 are free to rotate independently in the channel 96 of the cam. As these rollers follow the contour of the cam surfaces they will alternately hold the die holders or carriers at rest or cause them to rotate depending upon what surface of the cam the rollers engage. Figure 11 shows the position of the rollers when the machine is at rest and the dies expanded. Each of the rollers will be in contact with a similar point of its particular cam surface and all of the arms move the same amount because all of the cam surfaces are symmetrical. As the rollers ascend the rises of the cam the dies will gradually expand and be carried away from the pipe being threaded. When the rollers descend down the drop of the cams the dies will gradually contract until the rollers reach the dwells where they will remain until the thread has been completely cut or until the rollers have reached the next succeeding high point which has advanced ahead of the head because of the gear arrangement as has been explained.

The spindle 69 is rotatively mounted in bearings 97 provided in the main bed of the machine. It has a bearing surface 98 for mounting the disc gear which idles freely thereon. On the extreme right end 99 I have keyed the die holder head 100 which is rotated by the spindle 69. In order to make the heads interchangeable I have provided a face plate 101 which is held on the shaft by means of screws 102. The outer portion 103 of this face plate extends sufficiently to overlap the box of the die holder head and holds it in a fixed position on the spindle. This plate also acts as a gauge for the pipe while placing it in position prior to the threading operation. When a pipe is placed in the machine to be threaded its end is made to butt against the surface 104 of the plate which determines the length of thread. In addition to being a gauge the face plate acts as a guide for the cutting oil in order to insure proper distribution of the oil on the dies during the threading operation. I accomplish this by means of the radial channels 105 cut in the back of the plate. These channels connect to holes 106 in the plate on the outer surface that are in the proper position to direct the oil on the pipe while the thread is being cut. The oil is supplied to the channels through the passage 107 in the spindle which in turn receives the oil from a pipe coupled to the spindle, the oil being delivered from the usual type of circulating pump well known in the machine tool art.

Dies and die holder

Referring to Figures 8, 9 and 10, a preferred form of dies is illustrated. The surface 108 of my die is a plane surface in which I cut V-shaped grooves 108a at such angles as to conform to the threads desired. Looking at Figure 8 it will be seen that the right hand end 109 is lower than the left hand end 110. This difference in height is made sufficient to give the proper taper to the thread. The cutting edges of my dies are indicated at 111. The back 112 of the die is a flat surface, and it is held firmly against a similar surface on the die holder. The two sides 113 are cut at an angle in order to obtain a wedging action when the dies are clamped to the holders. These dies are interchangeable from one position to another because all of the dies are alike. In the case illustrated I use six dies and each die is offset along the axis of rotation of the head 100 with relation to the adjoining die one-sixth of the distance between the crests 114 of the V grooves. From this it can be seen that starting with die number one and ending with number six continuing around a circle I will have the equivalent of the lead of a screw.

The die holders 115 are rotatively supported in the head in bearings 116 by means of the shoulder studs 117 which are limited in thrust by the flange 118. They are rotatively connected in order that they may be moved by the action of the cam. Extending from the thrust flange is a boss for holding the die in place. One side 119 of this boss is dovetailed at an angle to conform to the sides 113 of the dies. The other sides 120 are drilled and tapped for the screws 121 which hold the clamp plates 122 against the dies while the clamp plates in turn hold the dies rigidly in place in their holders.

In Figures 17 to 20 I have shown the composite parts which will enable me to cut threads of standard dimensions, as for example may be required for solid screws and the like. I have shown the left end portion 111a having cutting edges 111b, and provided with a dovetail 111c which fits within a groove 111d in the right end composite die piece 111e. The right end piece has cutting edges 111f.

Supposing that it is desired to thread a solid cylindrical object with, for example, a four inch thread. The two composite pieces 111a and 111e may be fitted together and mounted in the die holders 115 in the usual manner. In Figure 20 I have shown an assembly of a left composite part 111a, and a right composite part 111e, with an indefinite number of filler pieces 111g fitting in between the right and left pieces. Thus, it will be obvious that if piece 111a is two inches cutting area, and 111g one inch cutting area, any desired width of thread may be had by combining the proper number of filler pieces with the right and left end pieces.

The die holders will ordinarily be of sufficient width to accommodate a desired width of composite die structure, but should an unusually wide thread be desired, it will sometimes be necessary to insert a special head to accommodate an unusually wide composite die assembly.

Operation

In order to cut a thread on a piece of pipe I have the upper jaws tipped upward so that I can lay a length of pipe to be cut into the V groove and slide it to the left until the end to be threaded butts against the face plate. When the pipe is in this position I bring the upper clamp jaws down on the pipe manually or by the hydraulic means, and tighten the clamp bolts down by hand. I then rotate the clutch lever to the right and cause the clutch halves to engage each other. This starts the die head and the cam to rotate. While the cam and the head are rotating the die holders will rotate because the rollers on their crank arms will start riding down the drop towards the dwell where they will stop rotating until a definite number of turns have been made by the head. The cam will cause the die holders to rotate because it is leading or rotating at a greater speed than the head by virtue of the gear arrangement. The cam will continue to lead the head, and the next succeeding rises cause the rotation of the dies away from the pipe, ending the threading operation when the cam and the head come to rest with the die rollers on the tops of these next succeeding cam rises.

In Figures 14, 15 and 16 I have illustrated the various stages in the process of cutting threads. Figure 14 shows the results of one complete revolution of the head. The pipe 22a will have nine grooves cut by the teeth 111 of the dies. At the end of the first one sixth turn of the head; instead of each die tooth following around in a path lying in a plane extended at right angles to the axis of the pipe, each tooth will cause the pipe to advance forming groove as indicated at 122, which is inclined into the groove cut by the die in the path of which the particular die described is following. This intermittent advancing of the pipe, caused by the difference in the energy required to continue advancing in a true arcuate path as compared with that necessary to advance the pipe so that each tooth may follow in a previously cut groove causes the intermittent advance of the pipe one-sixth of the distance between the crests of the V groove with each revolution of the head.

After one revolution of the head a curious appearing series of grooves, as indicated in Figure 14, will appear on the pipe with arcuate grooves 123 and abrupt inclined grooves 122. After three revolutions of the head the grooves appear as indicated in Figure 15 with the grooves 122 being less abrupt as indicated at 122a. After one revolution the dies move out of the first groove, leaving it slightly jagged but still with a true V shape as contrasted to the flattened grooves formed at the ends of the threads of pipes with pipe threading machines formerly in use.

As the threads are cut deeper the inclined grooves approach the formation illustrated at 122b in Figure 16 in which the arcuate grooves 123 and the inclined grooves 122b are no longer readily noticeable and the thread is practically a true helix.

The theory of the operation hereinbefore described will be difficult to understand as mathematically it will not appear credible that dies moving into engagement along lines lying in planes extended at right angles to the axis of the article being threaded, would cut a true helical thread, but nevertheless it will be found that the approach to a true helix will be sufficient for all practical purposes.

As the die holders rotate the dies will come in contact with the pipe and bear down on it so as to develop a thread on the surface as hereinbefore described. During the continued downward movement a substantially true helical thread is cut. While the rollers are riding over the dwells of the cam there will be a cleaning action on the thread which, after the desired depth of thread has been reached, will now begin to back the dies out of the threads. The clamp carriage, being free to slide to the right, will continue to advance until the dies have been completely disengaged with the pipe. The machine may be stopped at any time, but it is impossible to insert a piece of pipe until the cycle is completed because the dies may be partially or entirely collapsed, depending upon the position of the cam. This, of course, insures that every thread will be the same because there can be but one starting point. The threads will further be found to be of true V shape. In the case when pipe is being threaded the machine will make a definite number of turns until the Geneva star wheel has been moved around one turn so that the two pins, one on the wheel and the other on the clutch lever, will have come in contact and caused the clutch lever to rotate and disengage the clutch halves and thereby stop the machine and leave the machine in position to insert a new piece of pipe for threading.

In order to cut a left hand thread with my machine, I reverse the direction of rotation and position of cutting edge of the die. It will further be within the scope of my invention to provide a machine for cutting internal threads operable on a similar principle.

Having thus described my invention, what I claim as new and desire to secure by Letters Patent, is:—

1. The method of threading a cylindrical object which consists in circumferentially spacing toothed cutting elements around the periphery of the object with their teeth at right angles to the axis of the object and spacing the cutting elements in axially offset relation depending on the width of the thread to be cut and the number of cutting elements used and continuously cutting said object with said elements.

2. The method of threading a cylindrical object which consists in circumferentially spacing toothed cutting elements around the periphery of an object with their teeth at right angles to the axis of the object to be threaded, positioning said elements in axially offset relation each with relation to another a distance equal to the width of the thread divided by the number of cutting elements.

3. In a threading machine cutting tools having teeth of a number equal to the number of threads to be cut, said tools having teeth and being offset one from the other by such amount that the total amount of offset is equal to the distance between two teeth and having their teeth inclined to the circle of rotation in a plane at right angles to the axis thereof means for feeding the tools toward the axis of the work, means for holding the work and engaging the tools therewith in a rotary manner, the offset of the teeth providing for the leading movement of the work by the cutting of each tooth from its cut to the adjacent end of the cut of the next preceding tooth, the total lead being the distance between two teeth, and means for stopping the rotary engagement after this lead has taken place.

4. A threading machine comprising means for supporting work so that it is movable lengthwise, and cutting tools each having a series of teeth along the work, said tools being spaced circumferentially and offset along the axis of the work, and operating means whereby the teeth of said tools make axially spaced circumferentially extending and succeeding cuts and enforce their lead on the work by the cutting of each tool from one end of its tooth cuts into the adjacent end of the next succeeding tooth cuts.

5. A threading machine having the lead provided by the action of circumferentially spaced and axially offset tools each having a series of teeth along the work, and by the relative slidability of the tools and the work axially, said action characterized by the cutting by each tool of a set of circumferential tooth cuts and each tool then cutting from said cuts into the axially offset tooth cuts made by the next preceding tool.

6. The method of cutting substantially helical threads around an article of circular cross section comprising bringing into engagement with the article a series of cutting tools each having a series of teeth along the work, said tools being spaced circumferentially of the article and offset axially thereof, causing relative rotation of the tools and article on the axis of the article and allowing relative axial movement of the tools and article due to the cutting of each tool from its circumferential tooth cuts into the tooth cuts of the next preceding tool and the resistance of the cut material in excess of the resistance to the axial movement.

7. The method of cutting substantially helical threads around an article of circular cross section comprising feeding radially into the material of the article a series of cutting tools spaced circumferentially of the article and offset axially thereof while causing relative rotation of the tools and article and allowing relative axial movement of the tools and article due to the cutting of each tool from its circumferential cut into the cut of the next preceding tool and the resistance of the cut material in excess of the resistance to the axial movement, continuing the radial feed of the tools until the thread is of the desired depth, and then continuing the relative rotation without the radial feed whereby the tools increase the approximation to helical form of the threads by their continued action against sides of the threads as they continue the relative axial movement.

8. The method of cutting substantially helical threads around an end portion of an article of circular cross section comprising bringing into engagement with said end portion a series of cutting tools each having a series of teeth from the end of the article axially along the article, spaced circumferentially of the article, with the teeth of each series offset from the teeth of each next series axially of the article, while causing relative rotation of the tools and article in such direction and allowing such freedom of relative axial movement of the tools and article that, due to the cutting of each tool from its circumferential tooth cuts into the tooth cuts of each preceding tool and the resistance of the cut material in excess of the resistance to the axial movement, the tools are fed off of the end of the article by the continued relative rotation.

9. A threading machine comprising a holder for an article of circular cross section, a series of cutting tools each having a series of teeth along the work, said tools being circumferentially spaced around the article when held by the holder and offset axially of the article, and means for feeding said tools radially into the material of the article, said holder and said series of tools being relatively rotatable on the axis of the article and relatively movable along said axis and each tool being inclined away from the circumference of the article substantially in a plane at right angles to the axis of the article and causing the relative axial movement incident to the relative rotation by cutting circumferentially of the article and then cutting into the cuts of the teeth of the next preceding tool with the resistance of the cut material greater than the resistance of the axial movement.

10. A threading machine as specified in claim 9, in which the means for feeding the tools radially has a reverse action incident to continued relative movement of the tools and article, to withdraw the tools from the article.

11. A threading machine as specified in claim 9, in which the means for feeding the tools radially has a period of rest during continued relative movement of the tools and article, and then has a reverse action incident to further relative movement of the tools and article, to withdraw the tools from the article.

12. A threading machine as specified in claim 9, in which there is means for limiting the total number of relative rotations of the tools and article.

13. A threading machine as specified in claim 9, in which there is a stop for locating an end of the article with the tool initially located a desired distance along the article from said end and the axial movement causes the tool to approach said end in the course of cutting the threads.

14. A threading machine as specified in claim 9, in which there is a stop for locating the end of the article with the tools initially located a desired distance along the article from said end and the axial movement causes the tools to approach said end in the course of cutting the threads, and in which the means for feeding the tools radially has a reverse action to withdraw the tools from the article when the tools are near said end.

15. A threading machine as specified in claim 9, in which there is a stop for locating the end of the article with the tools initially located a desired distance along the article from said end and the axial movement causes the tools to approach said end in the course of cutting the threads, and in which there is means for limiting the total number of relative rotations of the tools and article.

16. A threading machine as specified in claim 9, in which there is a stop for locating the end of the article with the tools initially located a desired distance along the article from said end and the axial movement causes the tools to approach said end in the course of cutting the threads, and in which the means for feeding the tools radially has a reverse action to withdraw the tools from the article when the tools are near said end, and in which there is means for limiting the total number of relative rotations of the tools and article.

17. A threading machine having movable means for holding an article to be threaded, a series of rotatable toothed threading dies, means for mounting said dies each with its teeth spaced along the axis of rotation of the series and in circumferentially spaced position around the article to be threaded to cut partly surrounding axially spaced grooves therein, with their teeth making guiding contact with the sides of the grooves being cut substantially only at their cutting edges, means for rotating said dies around the article to be threaded, and means for contracting said dies to engage their teeth with the article whereby the teeth by their said guiding contact and consequent freedom to cut into sides of grooves cut by preceding teeth, move said movable means and form a helical thread in said article.

18. A threading machine having movable means for holding an article to be threaded, a series of rotatable toothed threading dies, means for mounting said dies each with its teeth spaced along the axis of rotation of the series and in circumferentially spaced position around the article to be threaded to cut partly surrounding axially spaced grooves therein, with their teeth making guiding contact with the sides of the grooves being cut substantially only at their cutting edges, means for rotating said dies around the article to be threaded, and means for contracting said dies to engage their teeth with the article whereby the teeth by their said guiding contact and consequent freedom to cut into sides of grooves cut by preceding teeth, move said movable means and form a helical thread in said article, and means for controlling the extent of contraction of said dies.

19. A threading machine having movable means for holding an article to be threaded, a series of rotatable toothed threading dies, means for mounting said dies each with its teeth spaced along the axis of rotation of the series and in circumferentially spaced position around the article to be threaded to cut partly surrounding axially spaced grooves therein, with their teeth making guiding contact with the sides of the grooves being cut substantially only at their cutting edges, means for rotating said dies around the article to be threaded, and means for contracting said dies to engage their teeth with the article whereby the teeth, by their said guiding contact move said movable means and form a helical thread in said article, and means for controlling the cycles of operation of said machine.

20. The process of cutting a helical thread in a cylindrical object which consists in engaging the object with a series of arcuately spaced multiple toothed cutters offset lengthwise of the object sufficiently to define the pitch of the thread by cutting grooves therein, with their teeth making guiding contact with the sides of the grooves being cut substantially only at their cutting edges thereby being free to cut into sides of grooves cut by preceding teeth, and rotating the cutters, whereby said teeth by their said guiding contact and consequent freedom to cut into sides of grooves cut by preceding teeth, cause the object to move with a proper lead automatically.

21. The process of cutting a helical thread in a cylindrical object which consists in engaging the object with more than two sets of arcuately spaced multiple toothed cutters offset lengthwise of the object so that the total amount of offset equals the pitch of the desired thread, with their teeth making guiding contact with the sides of the grooves which they are cutting to form the threads substantially only at their cutting edges, and rotating the cutters, whereby said teeth by their said guiding contact and consequent freedom to cut into sides of grooves cut by preceding teeth, cause the object to move with a proper lead automatically.

22. The process of cutting a helical thread in a cylindrical object which consists in engaging the object with a cutting element formed of a series of arcuately spaced multiple toothed cutters offset lengthwise of the object by an amount equal to the pitch of the desired thread, and relatively rotating the object and the cutting element to cut axially spaced grooves each partly surrounding the object, with the teeth of the cutters making guiding contact with the grooves being cut, substantially only at the cutting edges of the teeth, whereby the teeth, by said guiding contact and consequent freedom to cut into sides of grooves cut by preceding teeth, cause relative movement of said object and said cutting element axially of the object and form a helical thread in said object.

FREDERICK W. BREHMER.